PHASE CONTROL CIRCUIT FOR MULTIVIBRATORS

Filed June 8, 1964

INVENTOR.
C. NORMAN SPROTT
BY Karl A. Ohralik
ATTORNEY.

United States Patent Office 3,210,691
Patented Oct. 5, 1965

3,210,691
PHASE CONTROL CIRCUIT FOR MULTIVIBRATORS

Charles Norman Sprott, Lexington, Ky., assignor to International Business Machines Corporation, New York, N.Y., a corporation of New York Filed June 8, 1964, Ser. No. 375,415
8 Claims. (Cl. 331—113)

This patent application is a continuation-in-part of my United States Patent application entitled "Oscillator Synchronizing Apparatus," Serial No. 162,091, filed December 26, 1961, now abandoned.

This invention relates to electronic oscillators and more particularly to the synchronization of oscillators to produce an output potential having a predetermined phase relative to another time varying phenomena.

In certain electronic systems, it is frequently necessary to provide alternating electrical potentials of a predetermined phase relative to another time varying potential. That is, the potential must be synchronized so as to have particular polarity and magnitude at certain instants of time. Electrical circuits for synchronizing electrical oscillators have been provided heretofore. However, in the usual prior art systems, effective synchronization is achieved with a greater number of components or with components of relatively precise value. In either event, such systems entail a larger cost than is necessary for certain systems. The invention herein described provides means to positively adjust an oscillator to the phase desired in a time period which can theoretically be very short or almost instantaneous. Yet, the invention herein described requires only a minimum of components, none of which need be expensive or highly critical in performance.

It is accordingly a principal object of this invention to effect synchronization of an oscillatory circuit with simple and inexpensive circuit components.

It is a further object of this invention to provide means to initiate and complete the synchronization of an oscillator within a relatively short time using circuit components which can be simple and inexpensive.

In accordance with this invention, means are provided to synchronize a multivibrator type of oscillator having a capacitor in a time constant frequency determining circuit. A charge supply device is provided in a circuit independent of the basic oscillator; and a gate which is responsive to a synchronizing pulse of very short duration establishes a closed, series circuit including the charge supply device and the capacitor of the multivibrator to be synchronized. The charge supply device is designed to contain sufficient electrical energy to at least partially transfer its charge to the capacitor of the multivibrator to establish the desired synchronizing potential on the capacitor of the multivibrator. The synchronizing pulse for establishing the closed series circuit can be of very short time duration relative to a half period of the multivibrator.

The charge supply device could be, for example, a potential source such as a battery. However, in accordance with the preferred embodiment of the invention, the charge supply device is a capacitor which is arranged operatively with a potential source so as to be charged by that potential source. The closed, series circuit is designed to be one of very low impedance to facilitate transfer of charge during a short synchronizing time. The magnitude of the charging potential source and the capacity of the current source capacitor are selected with regard to the capacity of the capacitor in the multivibrator so that when the closed series circuit of low impedance is established between the two, a pre-established charge of a magnitude which places the multivibrator in a certain phase status of its operation is transferred to the capacitor in the multivibrator. It will be noted that a capacitor as herein used is a very practical means to provide charge which will transfer in large amounts quickly and thus provide fast synchronization.

A preferred means is to have the second capacitor of a magnitude much, much greater than the capacity of the capacitor in the multivibrator and to charge the second capacitor to a potential to which it is desired to bring the capacitor in the multivibrator. It should be noted, however, that the second capacitor need not be of such greater magnitude. The second capacitor can be of a relatively small capaicty and can be charged with a potential source considerably larger in potentiat than that which is desired to transfer to the capacitor of the multivibrator. Any excess of charge transferred to the capacitor of the multivibrator can be obviated by clamping the capacitor to the predetermined potential level.

The foregoing and other objects, features and advantages of the invention will be apparent from the following more particular description of a preferred embodiment of the invention as illustrated in the accompanying drawings. In the drawings.

Figure 1:
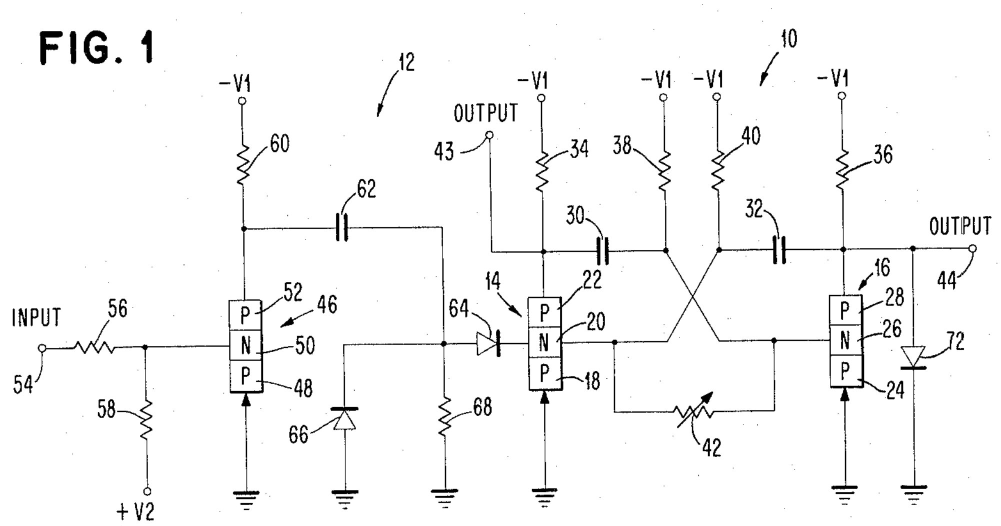
FIG. 1 is a shematism of a multivibrator type of oscillator which also shows the present invention incorporated for sychronization.

Referring now to FIG. 1 of the drawings for a detailed description of one embodiment of the invention, 10 represents generally an astable multivibrator type of circuit and 12 represents a synchronizing driver circuit according to the invention which is useful for synchronizing the circuit 10.

As active circuit elements, the circuit 10 includes a pair of transistors 14 and 16, each of the PNP type. It should be understood that other amplifying devices could be equally well employed with appropriate changes of other circuit elements as may be made by one skilled in this art. Transistor 14 includes a grounded emitter 18, base 20, and a collector 22; and transistor 16 incudes a grounded emitter 24, base 26, and a collector 28. In the characteristic manner, the collector 22 is coupled to the base 26 through a capacitor 30, having respective plates connected to these electrodes; and collector 28 is coupled to base 20 through a capacitor 32 having respective plates connected to these electrodes. Negative, direct potentials are applied to collectors 22 and 28 from a source designated $-V1$, through respective resistors 34 and 36 and the bases 20 and 26 are biased by the same negative, direct potential applied to these bases through respective resistors 40 and 38. An adjustable resistor 42 is connected between bases 20 and 26, and this resistor together with resistors 38 and 40 and capacitors 30 and 32 is useful in adjusting the frequency of oscillation of the circuit.

The circuit 10 as thus far described is responsive to the application of potential $-V1$, as shown, to oscillate and provide a rectangular wave at each of the output terminals 43 and 44. When the potential $-V1$ is applied to the electrodes as shown, notwithstanding the fact that transistors 14 and 16 are of the same type and make, one of these transistors conducts somewhat more than the other and thus, produces at its collector a higher (less negative) potential than appears at the collector of the other. Purely for purposes of explanation, the circuit will be viewed beginning at one point in the oscillations of the circuit as it functions as an oscillator. It will be assumed that transistor 14 begins to conduct. Through the capacitor 30, this increase of potential is applied to the base of transistor 16 and thus reduces conduction therein. The lower conduction in transistor 16 produces a lower potential (more negative) at its collector 28, which potential change is applied to base 20. Consequently, transistor 14 conducts even heavier. This regenerative sequence of events occurs in extremely rapid succession and established a first condition of circuit 10 in which saturation conduction occurs in transistor 14 by judicious choice of resistor 40 and transistor 16 is cut off. In this first condition, capacitor 32 charges eponentially to a potential —V1 through the emitter-base junction of transistor 14 and resistor 36. Simultneously, the capacitor 30 discharges exponentially through the collector-base circuit of transistor 14 and resistor 38 and also through resistors 40 and 42 in series. When the capacitor 30 has discharged, the potential at the junction of resistor 38 and capacitor 30 begins to assume a negative value which biases transistor 16 to conduction. Transistor 16 is thus brought to conduction. The increased conduction through transistor 16 produces a more positive potential at its collector 28. Through the capacitor 32, this increase of potential is applied to the base 20 of transistor 14 and thus, reduces conduction therein in accordance with the regenerative sequence of events described above. Transistor 14 will be non-conductive until the capacitor 32 fully discharges, at which time the junction of resistor 40 and capacitor 32 begins to assume a negative value which biases transistor 14 once again to conduction.

Figure 2:
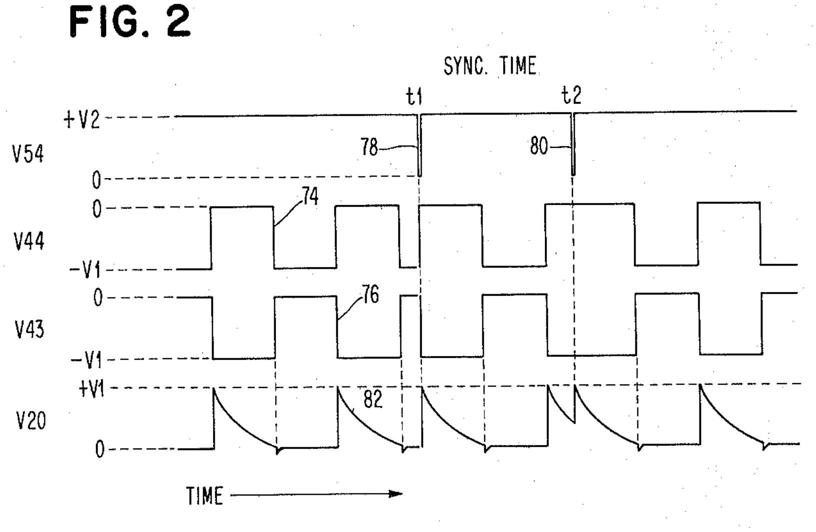
FIG. 2 illustrates wave forms of potentials at output terminals of the circuit shown in FIG. 1, both before and after synchronization.

As mentioned above, the capacitor 30 discharges through two parallel paths, a first path being through resistor 42, resistor 40, —V1 to ground potential at base 20 and the second path being through the resistor 38 to source —V1, to ground potential at base 20. The capacitor 32 discharges through two analogous paths, a first path being through resistor 42, resistor 38, —V1 to ground potential at base 26 and the second path being through resistor 38 to source —V1, to ground potential at base 26. It is thus clear that the adjusting of magnitude of variable resistor 42 will adjust the time of discharge of capacitors 30 and 32 to thereby control the frequency of oscillation of the circuit. In this manner, the circuit 10 operates with the transistors 14 and 16 alternately conducting and cut off and the period of time that any transistor is held cut off by a capacitor discharge current is dependent upon the time constant determined by the capacitance value of such capacitor and the resistance values of resistors through which it discharges. It may readily be understood that, if the capacitors 30 and 32 are of equal value and if resistors 38 and 40 are of equal value, the circuit 10 produces a square output wave at each of its output terminals 43 and 44 as shown in FIG. 2 of the drawings. Adjusting the frequency by adjustment of resistor 42 changes the discharge path the same amount for each capacitor and thus preserves the symmetry of the output.

The synchronizing driver circuit includes a transistor 46 of the PNP type having a grounded emitter 48, base 50, and a collector 52. The input terminal 54 is connected through a resistor 56 to base 50 and this transistor is biased to cut off, conditioned by a positive, direct potential applied to base 50 through resistor 58 connected between such a positive potential source, represented by the symbol +V2. A negative, direct potential is applied to collector 52 from source —V1, through a resistor 60.

In accordance with the invention, collector 52 of driver transistor 46 is connected to base 20 of transistor 14 through a series combination of capacitor 62 and a diode 64 having its cathode connected to base 20. In the preferred embodiment of this invention, capacitor 62 is very much larger than capacitor 32. Another diode, diode 66, having its cathode connected to the junction of capacitor 62 and diode 64, has its input anode grounded to thereby establish a ground reference to the junction of capacitor 62 and diode 64. A bypass resistor 68 of relatively great magnitude is connected between this junction and ground.

The circuit 12, as shown, is effective to establish a second condition of circuit 10 as described hereinabove, i.e., with the transistor 14 cut off, transistor 16 conducting heavily and with capacitor 32 fully charged. This condition is represented at illustrative "sync." times $t1$ and $t2$ in FIG. 2 of the drawings, wherein the phase of the potentials at respective output terminals 43 and 44 preceding this time may be anywhere in the output wave cycle.

For an understanding of the manner in which circuit 12 is effective to produce synchronization, it is assumed that respective potentials, —V1, +V2, are applied as shown, that circuit 10 is oscillating freely and that capacitor 62 has become fully charged to a potential of —V1 through a circuit including diode 66, resistor 60 and potential source, —V1. Output potentials at terminals 43 and 44 have wave forms which appear at 76 and 74 prior to time $t1$. At either time $t1$ or $t2$ at which the described second condition is to be established in circuit 10, a negative potential pulse as represented at 78 or 80 is applied to input terminal 54. Transistor 46, which previous to the application of a pulse 78 or 80 was biased to cut off by potential, +V2, acting through resistor 58; is triggered into heavy conduction. In this condition, transistor 46 represents a very low impedance and effectively applies ground potential to the plate of capacitor 62 which is connected to resistor 60. Accordingly, a very low impedance series circuit is established from ground, through transistor 46, capacitor 62, diode 64, capacitor 32, and a diode 72 having its anode connected to collector 28 and its cathode grounded. The charge in capacitor 62 establishes a relatively heavy current in the low impedance series circuit above described which charges capacitor 32 positive with respect to the base 20 of transistor 14. Also, transistor 14 is biased to cut-off potential +V1 by the discharge of capacitor 62. In this manner the maximum charge for which the capacitor 32 of oscillating circuit 10 is designed is transferred at great speed onto capacitor 32 at "sync." times $t1$ and $t2$ as illustrated by FIG. 2. The transistor 16 is free to conduct and therefore capacitor 32 immediately begins to discharge exponentially through resistor 40 and the series combination of resistors 42 and 38 in the manner above described to begin an oscillation of the circuit 10 at the phase established by the maximum designed charge of capacitor 32. Wave form 82 of FIG. 2 shows the potentials resulting at base 20. The exponential discharge is represented by the curved portion of wave form 82. Diode 64 prevents discharge of this capacitor in any other manner.

It is to be noted that the synchronization of circuit 10 can occur at any time during its cycle of operation. This is clearly illustrated in FIG. 2 of the drawings wherein $t1$ and $t2$ are times during which the circuit is in different conditions, i.e., wherein transistor 14 is conducting heavily and cut off, respectively.

As hereinabove pointed out, capacitor 62 is preferentially very much larger than capacitor 32. Typically it may have a capacitance value of the order of 100 times as great as that of capacitor 32. By reason of this relationship of capacitance values and the fact that the diodes 64 and 72 and transistor 46 have negligible impedance to current transferred during discharge of capacitor 62 to capacitor 32, capacitor 32 charges very rapidly to substantially +V1. Initially, capacitor 62 is fully charged to potential —V1 through resistor 60, and capacitor 32 may have a potential of any value between zero and V1 depending upon the phase status of the oscillator 10. In the most extreme case capacitor 32 is initially uncharged and has a potential of zero across its plates. In this most extreme case, upon establishing the closed series circuit described, the transfer of charge to capacitor 32 may be expressed by:

$$(C32)(\Delta V32)$$

wherein C32 represents its capacitance and ΔV32 represents its potential change. However, this charge is received from capacitor 62 so that its decrement of charge is:

$$(C62)(\Delta V62)$$

wherein C62 is its capacitance and ΔV62 its potential charge. It follows that:

$$(C32)(\Delta V32)=(C62)(\Delta V62)=100(C32)(\Delta V62)$$

or $$\Delta V32=100(\Delta V62)$$

Thus, the change of potential of capacitor 32 is 100 times as great as the change of potential of capacitor 62. It is clear that if capacitor 62 is initially charged to potential —V1, just after synchronization, capacitors 62 and 32 each are charged to a potential of substantially 100/101*V*1.

After synchronization, the circuit 10 operates to produce potentials at terminals 43 and 44 having the usual rectangular wave forms.

Although the preferred embodiment, with capacitor 62 much larger than capacitor 32 provides the desired potential at capacitor 32 regardless of its charge since charge moves from capacitor 62 to capacitor 32 only until an opposite potential opposes the potential of capacitor 62, it is clear that alternatives exist to those skilled in the art. Capacitor 62 could be quite small provided that it was charged to a potential greater than the potential V1. Capacitor 62 would still discharge properly into capacitor 32. To properly control the magnitude of charge on capacitor 32, the junction between resistor 40 and capacitor 32 could be clamped by any means well known in the art so that it cannot exceed the predetermined maximum potential. One clamping means might be a diode with its cathode tied to a potential source of +V1.

While the invention has been particularly shown and described with reference to a preferred embodiment thereof, it will be understood by those skilled in the art that various changes in form and details may be made therein without departing from the spirit and scope of the invention.

What is claimed is:

1. A synchronization circuit for an oscillator having a first active element with an input and an output interconnected to a second active element with an input and an output to form an astable multivibrator, said astable multivibrator having a first capacitor in a time constant circuit between the output of said first active element and the input of said second active element for control of conduction of said second active element by the conduction status of said first active element, the combination comprising a charge supply device, means establishing a conductive connection between said capacitor and said charge supply device, said conductive connection comprising circuit elements adapted and connected in said synchronizing circuits to be permanently capable of conducting current in one direction during every operating status of said synchronizing circuit and including at least one unidirectional device to isolate the conductive connection from said first and said second active elements and also comprising normally non-conductive circuit means directly responsive to synchronizing signals to be triggered into conduction, and means to connect a source of synchronizing signals to said means responsive to synchronizing signals to selectively establish a closed, series circuit including said capacitor and said charge supply device to cause a charge from said charge supply device to be effective upon establishment of said closed, series circuit to establish a potential across said first capacitor proper to charge said capacitor through said conductive connection to thereby control the phase status of said oscillator.

2. A sychronization circuit for an oscillator having a first active element with an input and an output interconnected to a second active element with an input and an output to form an astable multivibrator, said astable multivibrator having a first capacitor in a time constant circuit between the output of said first active element and the input of said second active element for control of conduction of said second active element by the conduction status of said first active element, the combination comprising a potential source, means establishing a conductive connection between said capacitor and said potential source, said conductive connection comprising circuit elements adapted and connected in said synchronizing circuit to be permanently capable of conducting current in one direction during every operating status of said synchronizing circuit and including at least one uni-directional device to isolate the conductive connection from said first and said second active elements and also comprising normally non-conductive circuit means directly responsive to synchronizing signals to be triggered into conduction, and means to connect a source of synchronizing signals to said means responsive to synchronizing signals to selectively establish a closed, series circuit including said capacitor and said potential source to cause a charge from said potential source to be effective upon establishment of said closed, series circuit to establish a potential across said first capacitor proper to charge said capacitor through said conductive connection to thereby control the phase status of said oscillator.

3. A synchronizing circuit for an oscillator having a first active element with an input and an output interconnected to a second active element with an input and an output to form an astable multivibrator, said astable multivibrator having a first capacitor in a time constant circuit between the output of said first active element and the input of said second active element for control of conduction of said second active element by the conduction status of said first active element, the combination comprising a second capacitor, means establishing a conductive connection between said capacitors, said conductive connection comprising low impedance circuit elements adapted and connected in said synchronizing circuit to be permanently capable of conducting current in one direction during every operating status of said synchronizing circuit and including at least one uni-directional device to isolate the conductive connection from said first and said second active elements and also comprising normally non-conductive circuit means directly responsive to synchronizing signals to be triggered into conduction, means for charging said second capacitor to a predetermined potential, and means to connect a source of synchronizing signals to said means responsive to synchronizing signals to selectively establish a closed, low impedance, series circuit including said first and second capacitors to cause a charge present in said second capacitor to be effective upon establishment of said closed, low impedance series circuit to establish a potential across said first capacitor proper to charge said first capacitor through said conductive connection to thereby bring said oscillator to a predetermined phase status.

4. A synchronizing circuit for an oscillator having a first active element with an input and an output interconnected to a second active element with an input and an output to form an astable multivibrator, said astable multivibrator having a first capacitor in a time constant circuit between the output of said first active element and the input of said second active element for control of conduction of said second active element by the conduction status of said first active element and being electrically charged to a predetermined maximum potential and discharged during operation thereof, means for establishing a predetermined phase of oscillation in said oscillator with said first capacitor charged to said predetermined potential comprising a second capacitor, means for conductively interconnecting said capacitors for current of a certain polarity, normally non-conductive circuit means responsive to synchronizing signals to become conductive connected in a circuit from the side of said second capacitor electrically away from said first capacitor and said second active element to a point of reference potential, means for charging said second capacitor connected to said second capacitor on the side electrically away from said first capacitor and said second active element, said means for charging including a unidirectional conductive element poled for charging said second capacitor electrically connected between a point of reference potential and the side of said second capacitor near said first capacitor and said second active element, and means to connect a source of synchronizing signals to said means responsive to synchronizing signals to selectively establish a closed, low impedance series circuit through said means for conductively interconnecting between said first and said second capacitors and bypassing said means for charging to establish a charge in said first capacitor of an amount to create a potential substantially equal to said predetermined maximum potential in response to establishment of said closed low impedance series circuit, irrespective of the previous state of charge of said first capacitor.

5. A synchronizing circuit for a multivibrator oscillator having a first active element with an input and an output interconnected to a second active element with an input and an output to form an astable multivibrator, said astable multivibrator having a first capacitor in a time constant circuit between the output of said first active element and the input of said second active element for control of conduction of said second active element by the conduction status of said first active element and being chargeable to a predetermined maximum potential and dischargeable during operation thereof, means for establishing a predetermined phase of oscillation in said oscillator comprising a second capacitor, a first diode connecting said capacitors in series, said first diode being connected electrically between said first capacitor and the input of said second active element, a potential source connected to said second capacitor on the side electrically away from said first diode for charging said second capacitor by said potential source, a second diode connected to said second capacitor on the side electrically near said first diode and connected through circuit elements permanently capable of conducting current to a source of reference potential and poled for charging said capacitor by said potential source, a third diode connected to the output of said first active element and connected through circuit elements permanently capable of conducting current of a polarity to discharge said second capacitor to said reference potential and poled to discharge said second capacitor, and means including an electronic active circuit device responsive to a synchronizing signal of input potential of predetermined polarity for establishing a closed, series circuit between said second capacitor from the side electrically away from said first diode and said source of reference potential to thereby create a closed, series circuit including said capacitors and said first diode and said third diode and shunting said second diode to thereby transfer charge to said first capacitor to charge said first capacitor to said predetermined maximum potential and thereby establish the status of said multivibrator at a predetermined phase.

6. A synchronizing circuit for an oscillator having a first active element with an input and an output interconnected to a second active element with an input and an output to form an astable multivibrator, said astable multivibrator having a first capacitor in a time constant circuit between the output of said first active element and the input of said second active element for control of conduction of said second active element by the conduction status of said first active element and being chargeable to a predetermined maximum potential and dischargeable during the operation thereof, the combination comprising a second capacitor having a capacitance many times as large as that of the first capacitor, means for establishing a conductive connection between said capacitors, means for charging said second capacitor to a predetermined potential, said means for charging including a uni-directional conductive element connecting one electrical side of said second capacitor to a source of reference potential, and a steady, direct current potential source of the order of magnitude of said predetermined maximum potential of said first capacitor connected to the other electrical side of said second capacitor for charging said second capacitor to a potential at least substantially equal to said predetermined maximum potential of said first capacitor, and means responsive to synchronizing signals for selectively establishing a closed, low impedance series circuit including said first and said second capacitors and bypassing said uni-directional conductive element to cause a charge present in said capacitor to be effective upon establishment of said closed, low impedance series circuit to establish a potential across said first capacitor at least substantially equal to said predetermined maximum potential and thereby establish the status of said multivibrator at a predetermined phase.

7. A synchronizing circuit for an oscillator having a first active element with an input and an output interconnected to a second active element with an input and an output to form an astable multivibrator, said astable multivibrator having a first capacitor in a time constant circuit between the output of said first active element and the input of said second active element for control of conduction of said second active element by the conduction status of said first active element and being electrically charged to a predetermined maximum potential and discharged during operation thereof, means for establishing a predetermined phase of oscillation in said oscillator with said capacitor charged to said predetermined potential comprising a second capacitor having a capacitance value very much larger than that of said first capacitor and means for conductively interconnecting said capacitors for current of a certain polarity, a source of steady, direct current potential substantially equal to said predetermined maximum potential for charging said second capacitor to said predetermined maximum potential connected to said second capacitor on one electrical side, a uni-directional conductive element connecting said second capacitor from the other other electrical side to a source of ground potential, and means responsive to synchronizing signals for selectively establishing a closed, low impedance series circuit including said first and said second capacitors and bypassing said uni-directional conductive element to cause a charge to be established in said first capacitor establishing a potential substantially equal to said predetermined maximum potential in response to establishment of said closed low impedance series circuit, irrespective of the previous state of charge of said first capacitor.

8. A synchronizing circuit for a multivibrator oscillator having a first active element with an input and an output interconnected to a second active element with an input and an output to form an astable multivibrator, said astable multivibrator having a first capacitor in a time constant circuit between the output of said first active element and the input of said second active element for control of conduction of said second active element by the conduction status of said first active element and being chargeable to a predetermined maximum potential and dischargeable during operation thereof, means for establishing a predetermined phase of oscillation in said oscillator comprising a second capacitor having a capacitance value very much greater than that of said first capacitor, a first diode connecting said capacitors in series, said first diode being connected electrically between said first capacitor and the input of said second active element, a potential source substantially equal to said predetermined maximum potential connected to said second capacitor on the side electrically away from said first diode for charging said second capacitor by said potential source, a second diode connected to said second capacitor on the side electrically near said first diode and connected through circuit elements permanently capable of conducting current to a source of ground potential and poled for charging said second capacitor by said potential source, a third diode connected to the output of said first active element and connected through circuit elements permanently capable of conducting current of a polarity to discharge said second capacitor to a source of ground potential and poled to discharge said second capacitor, and means including an electronic active circuit device responsive to a synchronizing signal of input potential of predetermined polarity for establishing a closed, low impedance series circuit between said second capacitor from the side electrically away from said first diode and said source of reference potential to thereby create a closed, low impedance series circuit including said first and said second capacitors and said first diode and said third diode and shunting said second diode, said conductive connection consisting of circuit elements permanently capable of conducting current in one direction and also consisting of said means for establishing a closed, low impedance circuit to cause said first capacitor to be charged to the potential of said second capacitor in response to said input potential to establish a predetermined phase of said multivibrator.

References Cited by the Examiner

UNITED STATES PATENTS 3,133,257 5/64 Palmer et al. ---------- 331—113

OTHER REFERENCES

General Electric Transistor Manual, third edition, July 23, 1958, pages 105–109.

NATHAN KAUFMAN, *Acting Primary Examiner.*

JOHN KOMINSKI, ROY LAKE, *Examiners.*